US012699723B1

(12) United States Patent
Sejpal et al.

(10) Patent No.: US 12,699,723 B1
(45) Date of Patent: Aug. 4, 2026

(54) HYBRID ARTIFICIAL INTELLIGENCE CHAT SYSTEM WITH CONTEXTUAL ROUTING BETWEEN LANGUAGE MODEL AND DECISION TREE FLOWS

(71) Applicant: Maplebear Inc., San Francisco, CA (US)

(72) Inventors: Riddhima Sejpal, Dublin, CA (US); Jatin Jain, Issaquah, WA (US); Jiankun Song, New York, NY (US); Shuying Lin, Bellevue, WA (US); Huan Ma, Toronto (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 19/090,170

(22) Filed: Mar. 25, 2025

(51) Int. Cl.
*G06F 16/383* (2019.01)
*G06F 16/338* (2019.01)
*G06F 40/20* (2020.01)

(52) U.S. Cl.
CPC .......... *G06F 16/338* (2019.01); *G06F 16/383* (2019.01); *G06F 40/20* (2020.01)

(58) Field of Classification Search
CPC ....... G06F 16/338; G06F 16/383; G06F 40/20
See application file for complete search history.

(56) References Cited

U.S. PATENT DOCUMENTS

| | | | | |
|---|---|---|---|---|
| 12,259,913 | B1* | 3/2025 | Muschett | ................ G06F 16/38 |
| 12,265,565 | B2* | 4/2025 | Hamilton | ................ G06F 16/35 |
| 2021/0042372 | A1* | 2/2021 | Huang | ................ G06F 16/9538 |
| 2024/0249318 | A1* | 7/2024 | Spiegel | ............. G06Q 30/0269 |
| 2025/0077263 | A1* | 3/2025 | Karri | ..................... G06F 40/211 |
| 2025/0126155 | A1* | 4/2025 | Tiwari | ................... G06F 40/56 |
| 2025/0173330 | A1* | 5/2025 | Durg | .................... G06F 16/243 |

* cited by examiner

*Primary Examiner* — Kris E Mackes
(74) *Attorney, Agent, or Firm* — Fenwick & West LLP

(57) ABSTRACT

A hybrid artificial intelligence (AI) agent balances use of a plurality of predefined decision tree flows and one or more large language model (LLM) chatbots. A query is received from a user client device that is associated with a user. A routing LLM of the hybrid AI agent determines an intent of the user based in part on context associated with the query. The routing LLM selects a response model from the plurality of predefined decision tree flows and the one or more LLM chatbots based in part on the intent. The selected response model is used to determine a response to the query. The response is provided to the user client device.

20 Claims, 6 Drawing Sheets

500

400

500

HYBRID ARTIFICIAL INTELLIGENCE CHAT SYSTEM WITH CONTEXTUAL ROUTING BETWEEN LANGUAGE MODEL AND DECISION TREE FLOWS

BACKGROUND

Online platforms often use chatbots to address customer queries. In some instances, large language model (LLM) based chatbots are used. LLM-based chatbots can provide flexibility to understand a wide range of customer queries, but they can be inconsistent or inefficient for routine and well-understood flows (which can result in a poor customer experience). Moreover, these LLM-based chatbots are resource-intensive, and can lead to high operational costs due to extensive message exchanges for resolving customer queries. In other instances, online platforms may use tree-based chatbots (e.g., based on decision trees) without LLM capabilities. Tree-based chatbots typically are very efficient and consistent for routing and well-understood flows. But tree-based chatbots lack the flexibility in understanding and responding to nuanced queries (which can result in a poor customer experience) relative to LLM-based chatbots.

SUMMARY

In accordance with one or more aspects of the disclosure, a hybrid artificial intelligence (AI) agent that balances use of predefined decision tree flows and one or more LLM chatbots are described. The hybrid AI agent may be part of an online system. The online system may receive a query from a user client device that is associated with a user. The hybrid AI agent may use a routing LLM and a response model to address the query or a user intent associated with the query. The routing LLM may determine the intent of the user based in part on context (e.g., text of the query, order data associated with the user, user data associated with the user, etc.) associated with the query. The routing LLM may select a response model from a plurality of predefined decision tree flows and one or more LLM chatbots based in part on the intent. The hybrid AI agent may use the selected response model to determine a response to the query, and the response is provided to a user client device.

The predefined decision tree flows and the one or more LLM chatbots are all response models that the hybrid AI agent may use to address various queries. The hybrid AI agent may balance use of predefined decision tree flows with one or more LLM chatbots in order to improve various factors (e.g., response quality, cost, user satisfaction, etc.). For example, the routing LLM may first consider routing a query to one of the predefined decision tree flows, before considering routing the query to the LLM chatbot. In this manner, if the query does match well to one of the predefined decision tree flows, the routing LLM can pass the query to the selected predefined decision tree flow for quick and efficient processing. And for cases where the query is, e.g., nuanced or doesn't match well with any of the predefined decision tree flows, the routing LLM can pass the query to the LLM chatbot for processing. In this manner, the hybrid AI agent is able to, e.g., route frequently encountered or critical customer requests through a corresponding predefined structured tree flow, and route more nuanced or rare queries to an LLM chatbot. This dual system can reduce computing resources relative to a system that only uses LLM chatbots and enhance response accuracy and speed relative to other conventional chatbot frameworks.

DETAILED DESCRIPTION

Figure 1:
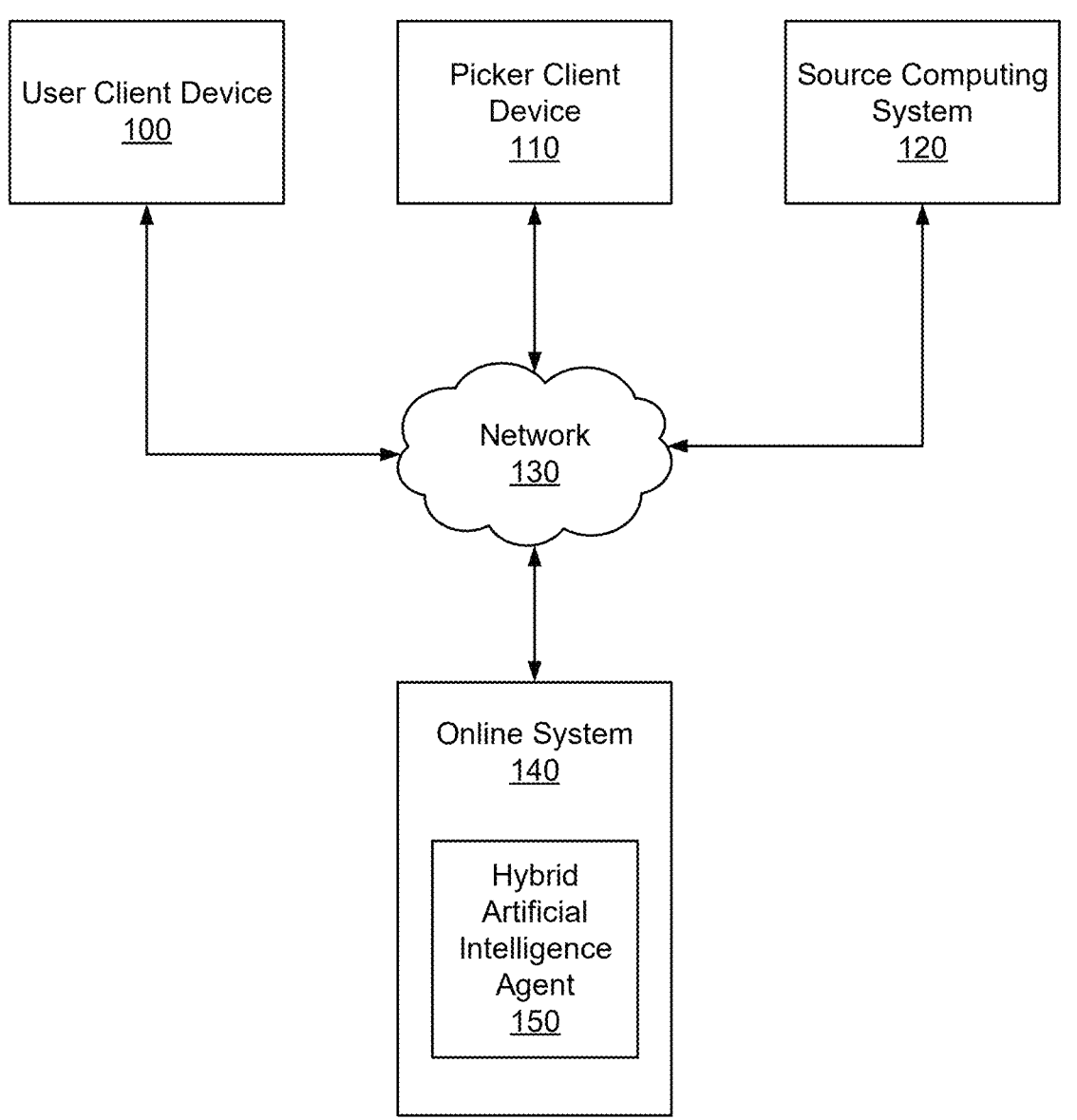
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 may be referred to as a "user device." The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

The user client device 100 may establish a session between the user and the online system 140. The session may be, e.g., an online chat session, an email session, a phone session, etc. In some embodiments, the user client device 100 may present the online chat session via a chat interface. In some embodiments, the chat interface is part of the ordering interface. The chat interface may be part of a client application operating on the user client device 100. Queries may be submitted to the online system 140 via the chat interface. A query may request that the online system 140 perform a certain task (e.g., request information (e.g., about an order), cancel an order, reschedule an order, etc.). A query may be associated with an intent of the user that describes one or more objectives that the user would like accomplished with the query. For example, a user may submit a query "What was in my last order?," and an intent associated with the query may be to just confirm that the order included the correct items. The intent associated with a query is not always clearly associated with a task. For example, the user may submit a query of "I am really frustrated today." The user client device 100 may receive messages (e.g., as part of an online chat session) from the online system 140 regarding the query, and respond to those messages. The received messages may be to, e.g., gather additional information from the user to help the online system 140 determine an intent of the user. In some embodiments, once the query is resolved (e.g., a requested task is complete or the online system 140 determines that the task cannot be completed), the user client device 100 receives a notification from the online system 140. The user client device 100 may present the notification to the user as part of the session. The notification provides some description regarding whether the query was resolved. For example, the user client device 100 may present in the chat interface a resolution to the service request (e.g., your order has successfully been re-scheduled).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 processes queries from user client devices. The online system 140 processes the queries using a hybrid artificial intelligence (AI) agent 150. The hybrid AI agent 150 uses response models to respond to the queries. Predefined decision tree flows and one or more LLM chatbots are the response models that the hybrid AI agent 150 may use to address various queries. A predefined decision tree flow is a response model designed to perform a particular task (e.g., cancelling an order, rescheduling an order, tracking a package, etc.). Predefined decision tree flows may be configured as linear decision trees, non-linear decision trees, or a combination thereof. Predefined decision tree flows are efficient and consistent for processing well-understood flows (e.g., cancelling an order, looking up a prior order, etc.), however, they can lack flexibility in understanding and responding to queries that do not map directly to their flow. In contrast, a LLM chatbot leverages one or more LLMs to respond to queries. An LLM chatbot can understand a wide range of queries, but they can be inconsistent (e.g., hallucinations) or inefficient for routine and well-understood flows (which can result in a poor customer experience). Moreover, the LLM chatbots may be resource-intensive, and can lead to high operational costs due to extensive message exchanges for resolving customer queries. The hybrid AI agent 150 balances use of predefined decision tree flows with one or more LLM chatbots in order to optimize response quality (e.g., speed of response and accuracy of response) and cost. The hybrid AI agent 150 includes a routing LLM. The routing LLM may, e.g., determine an intent associated with a query, and pass the query to a corresponding response model based on the determined intent. In this manner, the hybrid AI agent 150 is able to, e.g., route frequently encountered or critical customer requests through a corresponding predefined structured tree flow, and route more nuanced or rare queries to an LLM chatbot. This dual system can, e.g., reduce costs (relative to a system that only uses LLM chatbots) and enhance response accuracy and speed. As such the hybrid AI agent 150 can provide consistent high-quality customer service relative to other conventional query frameworks.

The queries may be received as part of online chat sessions with user client devices. The routing LLM may determine the intents of the users making the queries based in part on context of the queries. For each received query, the routing LLM selects a response model from a plurality of predefined decision tree flows and one or more LLM chatbots based in part on the intents. In some embodiments, the hybrid AI agent 150 may request (e.g., via one or more messages of the online chat session) additional context from a user client device 100 in order for the routing LLM to better determine the intent. The routing LLM may receive one or more messages from the user client device 100 during the online chat session that includes additional context. The routing LLM may determine the intent of the query based in part on the context and additional context gathered from user client device 100 during the online chat session (and in some cases from previous online chat sessions associated with the user).

The online system 140 uses the selected response models to determine responses to the queries. The selected response models may generate the responses based in part on information in a policy database of the online system 140. The policy database includes a plurality of policies for responding to various service requests. The online system 140 provides (e.g., as part of their respective online chat sessions) the responses to the user client devices.

Once a query is resolved, the online system 140 notifies (e.g., via the online chat session, an email, etc.) the user client device accordingly. In some embodiments, resolution may be passing the query to a human agent. The online system 140 is described in further detail below with regards to FIG. 2.

Figure 2:
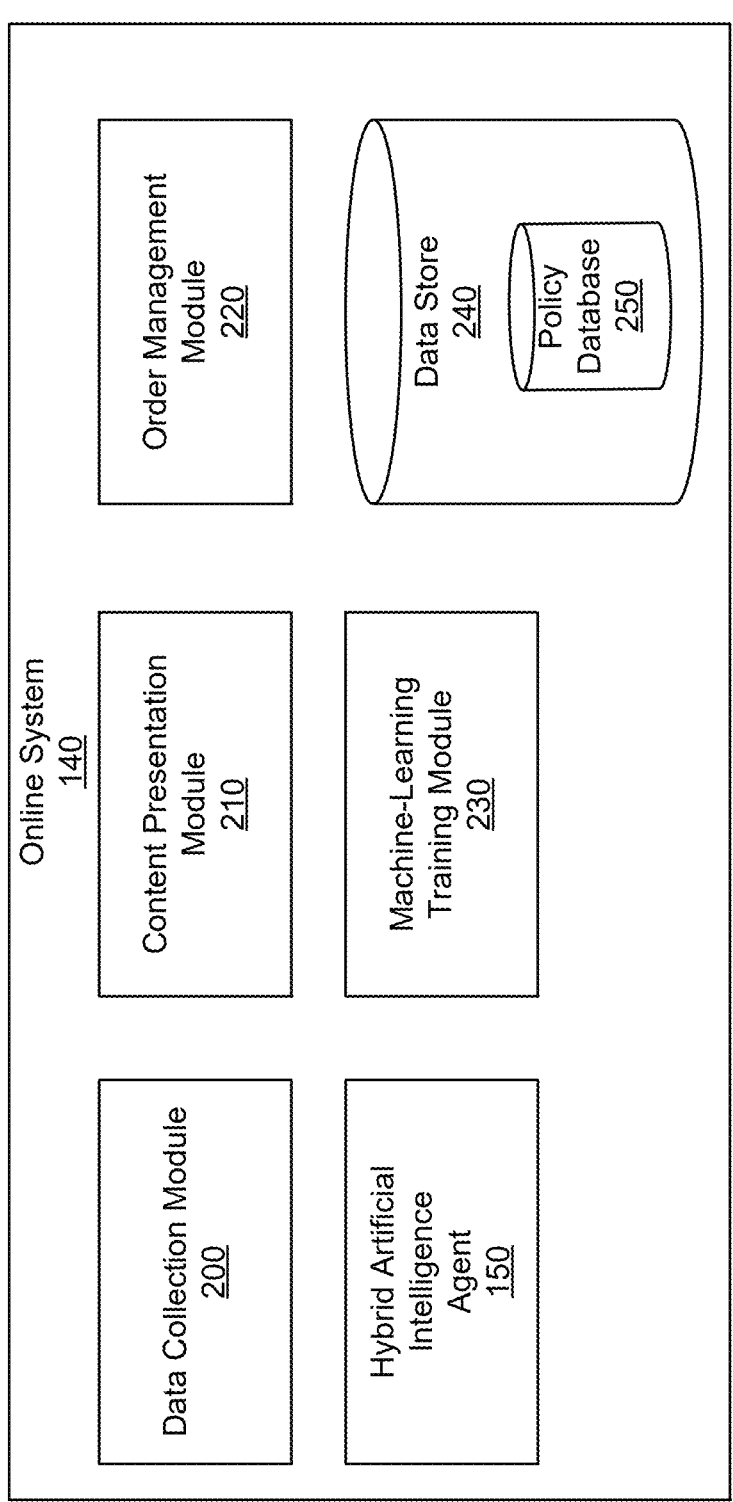
FIG. 2 illustrates an example system architecture for an online system, in accordance with some embodiments.

FIG. 2 illustrates an example system architecture for an online system 140, in accordance with some embodiments. The system architecture illustrated in FIG. 2 includes a data collection module 200, a content presentation module 210, an order management module 220, the hybrid AI agent 150, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The data collection module 200 collects service data. Service data is data that is associated with queries received from user client devices. Service data may include, e.g., queries received from user client devices, conversation history between a user client device and the hybrid AI agent 150, resolutions to the queries, user feedback on resolutions to queries, some other data associated with queries, or some combination thereof. Conversation history may include, e.g., content of messages, timing of messages, a number of messages sent by the user client device in a session or a number of messages sent by the hybrid AI agent to the user client device in the session, etc.

While user data, picker data, source data, item data, service data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device

100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

A policy database 250 stores a plurality of policies of the online system 140 regarding responding to queries from user client devices. The policies describe steps that, e.g., a response model or human agent of the online system 140 would proceed through in order to respond to various types of queries. Policies may include information (e.g., documents) on, e.g., order rescheduling, order canceling, receiving user complaints, determining eligibility for appeasements relating to items of an order, making appeasements relating to items of an order, updating user data, etc. For example, if a query is to cancel an order, a policy of the online system 140 regarding order cancelation may require a determination that the order is in fact eligible for cancelation for it to be canceled. The policy may also detail what conditions are to be met in order for an order to be eligible for cancelation (e.g., ok to cancel an order so long as a picker has not started shopping for the order). The policy may also detail steps that occur if the order is not eligible for cancelation (e.g., notify the user that the order cannot be canceled) and steps that occur if the order is eligible for cancelation (e.g., cancel the order). In some embodiments, there may be additional policies that pertain to handling special orders (e.g., do not allow cancelation after a shortened time window or have some other special rule) or for charge cancellation fees (e.g., maybe cancelling an order is allowed even if the picker has started shopping for an order if a fee is paid) such that the sequence has different actions.

The hybrid AI agent 150 processes queries received from user client devices. The hybrid AI agent 150 includes a routing LLM and a plurality of response models. The hybrid AI agent 150 uses response models to respond to queries from user client devices. The response models include predefined decision tree flows and one or more LLM chatbots. As noted above, a predefined decision tree flow is a response model designed to perform a particular task (e.g., cancelling an order). Predefined decision tree flows may be configured as linear decision trees, non-linear decision trees, or a combination thereof. A LLM chatbot leverages one or more LLMs to respond to queries. In some embodiments, a LLM chatbot may be an AI agent as described in U.S. application Ser. No. 18/985,066, filed on Dec. 18, 2024, which is hereby incorporated by reference in its entirety. One or more of the predefined decision tree flows or one or more of the LLM chatbots may leverage information from the policy database 250 to respond to a query. The hybrid AI agent 150 is discussed in detail below with regard to FIG. 3.

The machine-learning training module 230 trains machine-learning models (e.g., the routing LLM, the one or more LLM chatbots, etc.) used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, service data, or order data, which may be referred to respectively as training user data, training picker data, training item data, training service data, and training order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model (e.g., the routing LLM or a LLM chatbot) whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

For example, in some embodiments, the machine-learning training module 230 may train the routing LLM of the hybrid AI agent. The machine-learning training module 230 may access a set of training examples that includes training service data (e.g., queries, corresponding response models, corresponding feedback, etc.) for a plurality of training queries. The machine-learning training module 230 may apply the routing LLM to the set of training examples to generate a training output corresponding to a set of training response models selections for at least some of the training queries. The machine-learning training module 230 may back-propagate one or more error terms obtained from one or more loss functions to update a set of parameters of the routing LLM, and one or more of the error terms are based on a difference between a label applied to a test interaction of the set of training examples and the set of training response models selections. The machine-learning training module 230 may stop the back-propagation after the one or more loss functions satisfy one or more criteria.

In some embodiments, the machine-learning training module 230 may tune or re-train one or more machine-learning models. For example, the machine-learning training module 230 may tune or re-train the routing LLM or one or more of the LLM chatbots. The machine-learning training module 230 may receive feedback from user client devices on responses provided by response models. The machine-learning training module 230 may generate additional training examples that include service data associated with various queries associated with the feedback. The machine-learning training module 230 may fine tune or re-train the routing LLM or the one or more LLM chatbots using the additional training examples.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, service data, and picker data for use by the online system 140. The data store 240 may also store the policy database 250. In some embodiments, the policy database 250 is separate from the data store 240. The data store 240 data store 240 may store response models (e.g., plurality of predefined decision tree flows and one or more LLM chatbots) used by the hybrid AI agent 150. The data store 240 also stores trained machine-learning models (e.g., the routing LLM) trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
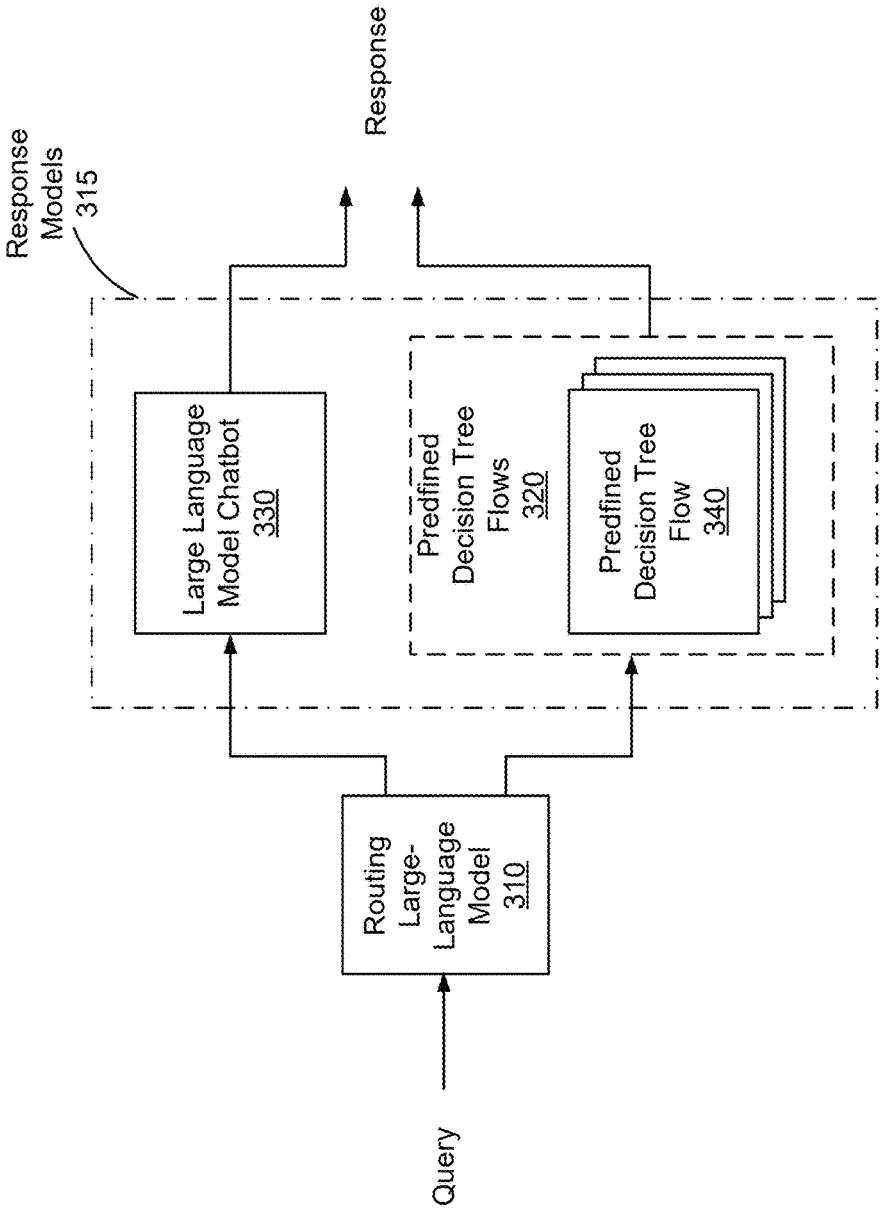
FIG. 3 is an example block diagram of a hybrid AI agent of FIG. 2.

FIG. 3 is an example block diagram of the hybrid AI agent 150 of FIG. 2. In the illustrated embodiment, the hybrid AI agent 150 includes a routing LLM 310 and response models 315. Alternative embodiments may include more, fewer, or different components from those illustrated in FIG. 3, and the functionality of each component may be divided between one or more of the components.

The routing LLM 310 receives a query from a user of a user client device (e.g., the user client device 100). The query may be received as part of a session (e.g., online chat session) the online system 140 has with the user client device.

The routing LLM 310 may determine intent (e.g., what the user would like done by the online system) of the user based in part on context of the query. Context of a query may include, e.g., content (e.g., text) of the query, user data associated with the user, item data associated with the user, order data associated with the user, service data associated with the user, some other information useful to determining intent, or some combination thereof. For example, the hybrid AI agent 150 may prompt the routing LLM 310 to determine an intent associated with the query. The routing LLM 310 may output, e.g., a candidate intent and a corresponding confidence value for the candidate intent. The hybrid AI agent 150 may determine whether the confidence value is sufficient to select a response model. In some embodiments, the hybrid AI agent 150 compares the confidence value for the intent to a threshold value (e.g., 90%), and determines that the intent is sufficient based on a result of the comparison. In some embodiments, the hybrid AI agent 150 may request (e.g., via one or more messages in the session) additional information from the user client device 100 in order for the routing LLM 310 to better determine the intent. The routing LLM 310 may receive one or more messages from the user client device during the session that include additional information. The routing LLM 310 may determine the intent of the query based in part on the context and additional information gathered from the user client device during the session or gathered from previous sessions (e.g., from session data) associated with the user. In this manner, the routing LLM 310 may gather enough information such that a confidence value associated with an intent is sufficient to select a response model.

For each received query, the routing LLM 310 may select a response model from the response models 315 based in part on the determined intent for the query. In the illustrated embodiment, the response models 315 includes predefined decision tree flows 320 and an LLM chatbot 330. In other embodiments, there are a plurality of the LLM chatbots 330. And in some cases, some or all of the plurality of LLM chatbots 330 may be trained or tuned differently. To select a response model for a query, the routing LLM 310 may score each of the predefined decision tree flows 320 based on the determined intent for the query. The routing LLM 310 may rank the scored plurality of predefined decision tree flows. The routing LLM 310 may identify a predefined decision tree flow 340 as having a highest score. If the score of the predefined decision tree flow 340 is above a threshold score, the routing LLM 310 may select the predefined decision tree flow 340 as the response model. And if the score of the predefined decision tree flow 340 is below the threshold score, the routing LLM 310 may select the LLM chatbot 330 as the response model. The routing LLM 310 may first consider routing a query to one of the predefined decision tree flows 320, before considering routing the query to the LLM chatbot 330. In this manner, if the query does match well to one of the predefined decision tree flows 320, the routing LLM can pass the query to the selected predefined decision tree flow for quick and efficient processing. And for cases where the query is, e.g., nuanced or doesn't match well with any of the predefined decision tree flows 320, the routing LLM 310 can pass the query to the LLM chatbot 330 for processing.

In some embodiments, a score for the predefined decision tree flow 340 may be close (e.g., within 10%), but not above the threshold score. The hybrid AI agent 150 using the routing LLM 310 may generate a message requesting additional information for the query that is then provided to the user client device. A message is then received from the user client device that includes additional information. The hybrid AI agent 150 using the routing LLM 310 may determine an updated intent based in part on the context and the additional information from the message. The routing LLM 310 may score each of the predefined decision tree flows 320 based on the updated intent. The routing LLM 310 may identify a second predefined decision tree flow (which in some cases is the predefined decision tree flow 340), of the predefined decision tree flows 320, with a highest score. The routing LLM 310 may then again determine whether the score for the second predefined decision tree flow is above the threshold score. And if the score meets the score threshold, the routing LLM 310 selects the second predefined decision tree flow. In this manner, the hybrid AI agent 150 may gather information that can potentially match the user to a particular predefined decision tree flow—versus automatic selection of the LLM chatbot 330.

The hybrid AI agent 150 uses the selected response model to determine a response to the query. The selected response model may generate the response based in part on information in a policy database (e.g., the policy database 250) or a data store (e.g., the data store 240). The online system provides (e.g., as part of the session) the response to the user client device.

For a given response provided to the user client device, the hybrid AI agent 150 may receive a message from the user client device. In some embodiments, the hybrid AI agent 150 may instruct the selected response model to respond to the message. In some embodiments, the routing LLM 310 may determine an intent of the message, and then select a response model from the plurality of predefined decision tree flows and the one or more LLM chatbots as described above. And the selected response model may respond to the message.

In some embodiments, the response model is able to resolve the query without gathering additional context from the user. In other embodiments, there may be one or more rounds of messaging between the user and the hybrid AI agent 150 before the query is resolved. A query may be resolved by, e.g., completing one or more requested tasks (e.g., cancelling an order, answering a question, etc.), passing the query to a human agent (e.g., if the response model is unable to address the query), determining that the task cannot be completed, etc. Once a query from the user client device is resolved, the online system 140 notifies (e.g., via the online chat session, an email, etc.) the user client device accordingly.

The hybrid AI agent 150 may communicate with users associated with user client devices via one or more communication channels. A communication channel may be, e.g., an online chat session, email, phone, etc. In resolving a query, the hybrid AI agent 150 may, e.g., receive and send messages to a user client device via one or more different communications channels. In some embodiments, the hybrid AI agent 150 is able to gather information from a user of a user client device via an online chat session in synchronous manner (i.e., parties continually listen for and act upon replies from each other). In other embodiments, however, the hybrid AI agent 150 may use another communication channel to gather information about a query in a synchronous manner. For example, the hybrid AI agent 150 may gather context about a query from a user during a phone call instead of an online chat session. One difference is that the hybrid AI agent 150 may perform speech-to-text operations on spoken content from the user to generate text messages, and prompt the routing LLM or the response model based in part on the text messages. Likewise, the hybrid AI agent 150 may perform text-to-speech operations on messages that are to be provided to the user client device to form audio messages, and provide the audio messages to the user client device. And while it may be preferable to gather context in a synchronous manner, in some embodiments, the hybrid AI agent 150 may use a communication channel (e.g., email) that gathers context in an asynchronous manner (i.e., parties do not actively monitor for and act upon replies from each other).

Figure 4A:
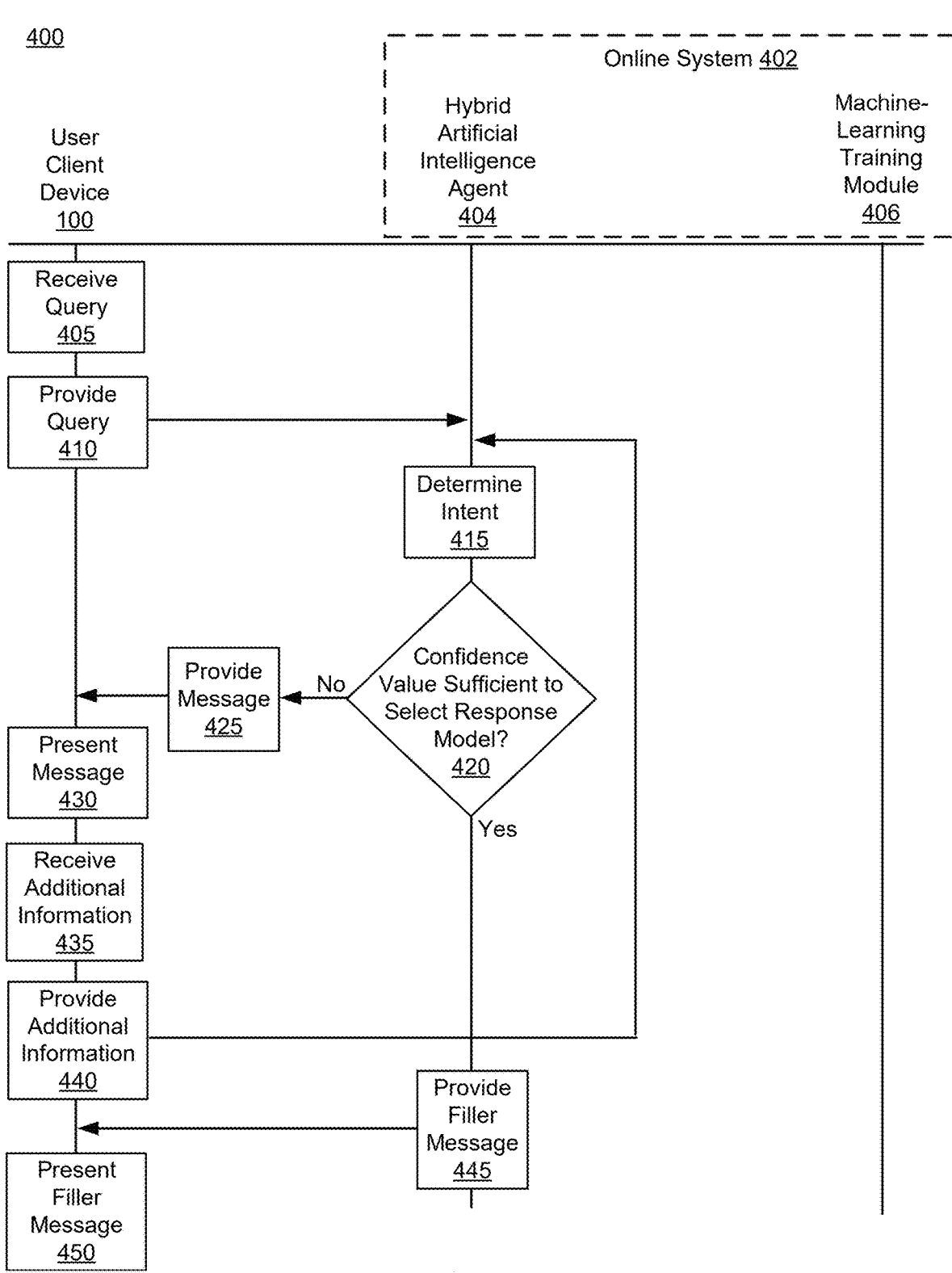
FIGS. 4A and 4B form an example sequence diagram describing an online system that balances use of predefined decision tree flows and one or more LLM chatbots to respond to queries from user client devices, in accordance with some embodiments.
Figure 4B:
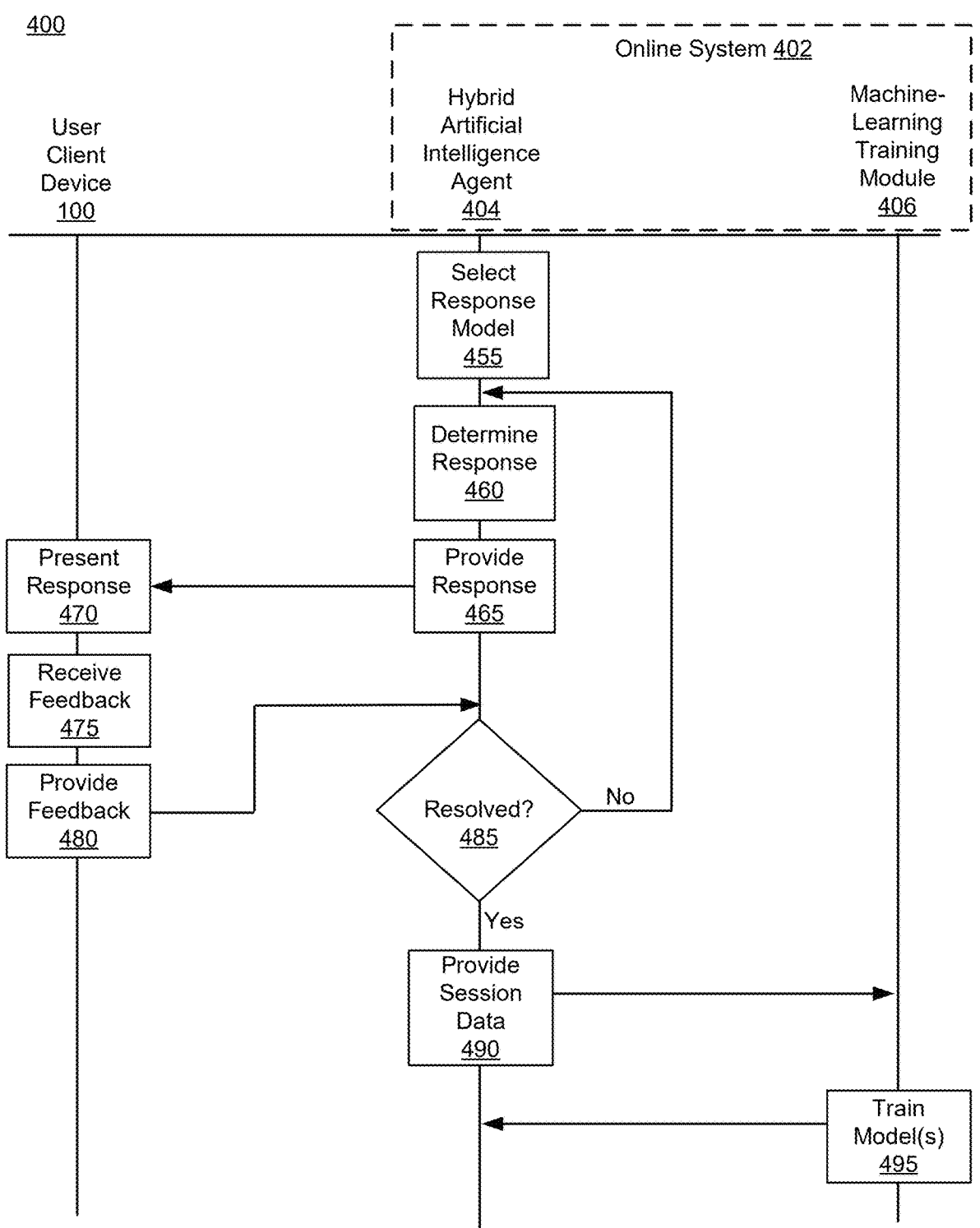

FIGS. 4A and 4B form an example sequence diagram 400 describing an online system 402 that balances use of predefined decision tree flows and one or more LLM chatbots to respond to queries from user client devices, in accordance with some embodiments. The online system 402 is an embodiment of the online system 140. Alternative embodiments may include more, fewer, or different interactions from those illustrated in FIGS. 4A-4B, and the steps may be performed in a different order from that illustrated in FIGS. 4A-4B.

A user client device 100 receives 405 a query from a user. The query may be received as part of a session (e.g., online chat session) between the online system 402 and the user client device 100. The user client device 100 provides 410 (as part of the session) the query to the online system 402.

A hybrid AI agent 404 of the online system 402 determines 415 an intent of the user based in part on context (e.g., text, user data, item data, order data, etc.) of the query. For example, the hybrid AI agent 404 may prompt a routing LLM (e.g., the routing LLM 310) to determine an intent associated with the query based in part on the context. The routing LLM may output, e.g., a candidate intent and a corresponding confidence value for the candidate intent. The hybrid AI agent 404 is an embodiment of the hybrid AI agent 150.

The hybrid AI agent 404 determines 415 whether the confidence value is sufficient to select a response model. In some embodiments, the hybrid AI agent 404 compares the confidence value for the intent to a threshold value (e.g., 90%).

In embodiments where the confidence value is less than the threshold value, the hybrid AI agent 404, may generate a message requesting additional information about the query. The message may be generated based in part on context (e.g., text of the query, user data, order data, etc.) of the query. The online system 402 provides 425 the message to the user client device 100. The user client device 100 presents 430 the message. The user client device 100 may receive 435 additional information from the user in response to the presented message. The user client device 100 provides 440 the additional information to the online system 402, and the hybrid AI agent 404 determines 415 the intent based in part on the context and the additional information. The routing LLM may output, e.g., a second candidate intent (which may be the same or different from the candidate intent output in the previous iteration) and a corresponding second confidence value for the candidate intent. The hybrid AI agent 404 determines 420 whether the second confidence value is sufficient to select a response model. In this manner, steps 420, 425, 430, 435, 440, and 415 may repeat until the hybrid AI agent 404 determines that a confidence value for a candidate intent is sufficient to select a response model.

In some embodiments, once the hybrid AI agent 404 determines that a confidence value for a candidate intent is sufficient to select a response model, the hybrid AI agent 404 may generate a filler message in response to the last message from the user client device 100. A filler message is a message that acknowledges a previous message from the user (e.g., "Understood. Please stand by while I review the order.") but does not provide resolution to the query. The online system 140 may then provide 445 the filler message to the user client device 100 which presents 450 the message to the user. The process may then move to step 455. In some embodiments, no filler message is generated, and the process moves directly from step 420 to step 455.

As such, there can be multiple rounds of messaging before intent is determined with enough confidence to select a response model. For example, the query initially provided (at step 410) to the hybrid AI agent 404 may have been "I am really frustrated today." The hybrid AI agent 404 may determine an intent of the user, and determine that a confidence value associated with the intent is not sufficient to select a response model. The hybrid AI agent 404 may generate a message to request additional information about the query from the user. For example, the hybrid AI agent 404 may generate a message like, e.g., "I'm sorry to hear that. What's the issue you're facing today?" And the online system 140 provides 425 the message to the user client device 100. Responsive to the message, the user may provide additional information clarifying the intent. For example, the user may state in their response to the message, e.g., "It's about today's order." This additional information would likely not be enough to identify the intent with sufficient confidence to select a response model, and the hybrid AI agent 404 would again generate an additional message requesting more information. For example, the hybrid AI agent 404 may use order data associated with the user to determine that the user had placed an order earlier that day, and generate a message like, e.g., "I see. Do you mean the order placed today, labeled as Order Number 1976?" which is then provided to the user client device 100 for presentation to the user. The user may state in their response to the message, e.g., "Yes, that is correct." This additional information does confirm some details, but it does not identify the intent (e.g., one or more objectives the user would like accomplished with the query). As such, it would likely not be enough to identify the intent with sufficient confidence to select a response model, and the hybrid AI agent 404 would again generate an additional message requesting more information. For example, the hybrid AI agent 404 may use the received additional information to generate a message like, e.g., "Thank you for confirming. How can I assist you with Order Number 1976?" which is then provided to the user client device 100 for presentation to the user.

The user may state in their response to the message, e.g., "I would like to cancel the order." This additional information identifies the intent of the user in making the query. As such, in this example, it would be enough to identify the intent with sufficient confidence to select a response model, and the hybrid AI agent 404. The hybrid AI agent may generate a filler message (e.g., "Alright, I understand you wish to cancel Order Number 1976. Let me check the current status of your order."), and provide 445 the filler message to the user client device 100. The user client device 100 may then present 450 the filler message to the user. The process flow then moves to step 455 to select a response model.

The hybrid AI agent 404 selects 455 a response model. The hybrid AI agent 404 may use the routing LLM to select the response model from a plurality of predefined decision tree flows and one or more LLM chatbots. The routing LLM may select the response model based in part on the determined intent. To select a response model, the routing LLM may score each of the predefined decision tree flows based on the determined intent. The routing LLM may rank the scored plurality of predefined decision tree flows. The routing LLM may identify a predefined decision tree flow that has a highest score. If the score of the predefined decision tree flow is above a threshold score, the routing LLM may select the predefined decision tree flow as the response model. And if the score of the predefined decision tree flow is below the threshold score, the routing LLM may select an LLM chatbot as the response model.

Continuing with the example above, as order cancellation is a task that generally is well defined, the predefined decision tree flows may include a predefined decision tree flow for order cancellation. As such, the predefined decision tree flow for order cancellation would have a highest score, and in this example, the score is above the threshold score. Accordingly, the routing LLM may select the predefined decision tree flow for order cancellation as the response model. In contrast, if the intent were, e.g., asking a non-standard question about a cancellation policy, it is likely that the scores for the predefined decision tree flows all would be below the threshold score. As a result, the routing LLM would select the LLM chatbot as the response model.

The hybrid AI agent 404 uses the selected response model to determine 460 a response to send to the user client device 100. For example, continuing with the example above, the predefined decision tree flow for order cancellation may, e.g., determine whether the order is eligible for cancellation (e.g., using information in the policy database 250). If eligible, the hybrid AI agent may cancel the order and generate a response notifying the user that the order is now canceled. If not eligible, the hybrid AI agent may generate a response notifying the user that the order may not be canceled (and in some embodiments, why it cannot be canceled). The online system 402 provides 465 the response to the user client device 100. The response may be provided to the user client device 100 as part of the session (e.g., the online chat session). The user client device 100 presents 470 the response to the user.

In this embodiment, the user may review the response, and provide feedback on the response. In some embodiments, the feedback may indicate a level of satisfaction of the user with the response. The user client device 100 receives 475 the feedback, and the user client device 100 provides 480 the feedback to the online system 402. The hybrid AI agent 404 determines 485 whether the response has been resolved based in part on the feedback. If the response has not been resolved, the process may move to step 460 in order for the response model to determine 460 a new response based in part on the feedback. In some instances (not illustrated), instead of the process moving to step 460, the process may instead move back to step 415, where intent is re-determined in part based on the feedback (and the process flow continues from 415).

If the hybrid AI agent 404 determines that the response has resolved the query, the hybrid AI agent 404 may provide 490 session data to a machine-learning training module 406. The machine-learning training module 406 is an embodiment of the machine-learning training module 230. The session data may include, e.g., conversation history between the user client device 100 and the hybrid AI agent 404, which response model was selected, feedback from the user regarding the response, etc. The machine-learning training module 406 may train 495 one or more machine-learning models of the online system 402 based in part on the session data. For example, the machine-learning training module 406 may train the routing LLM using the session data.

Figure 5:
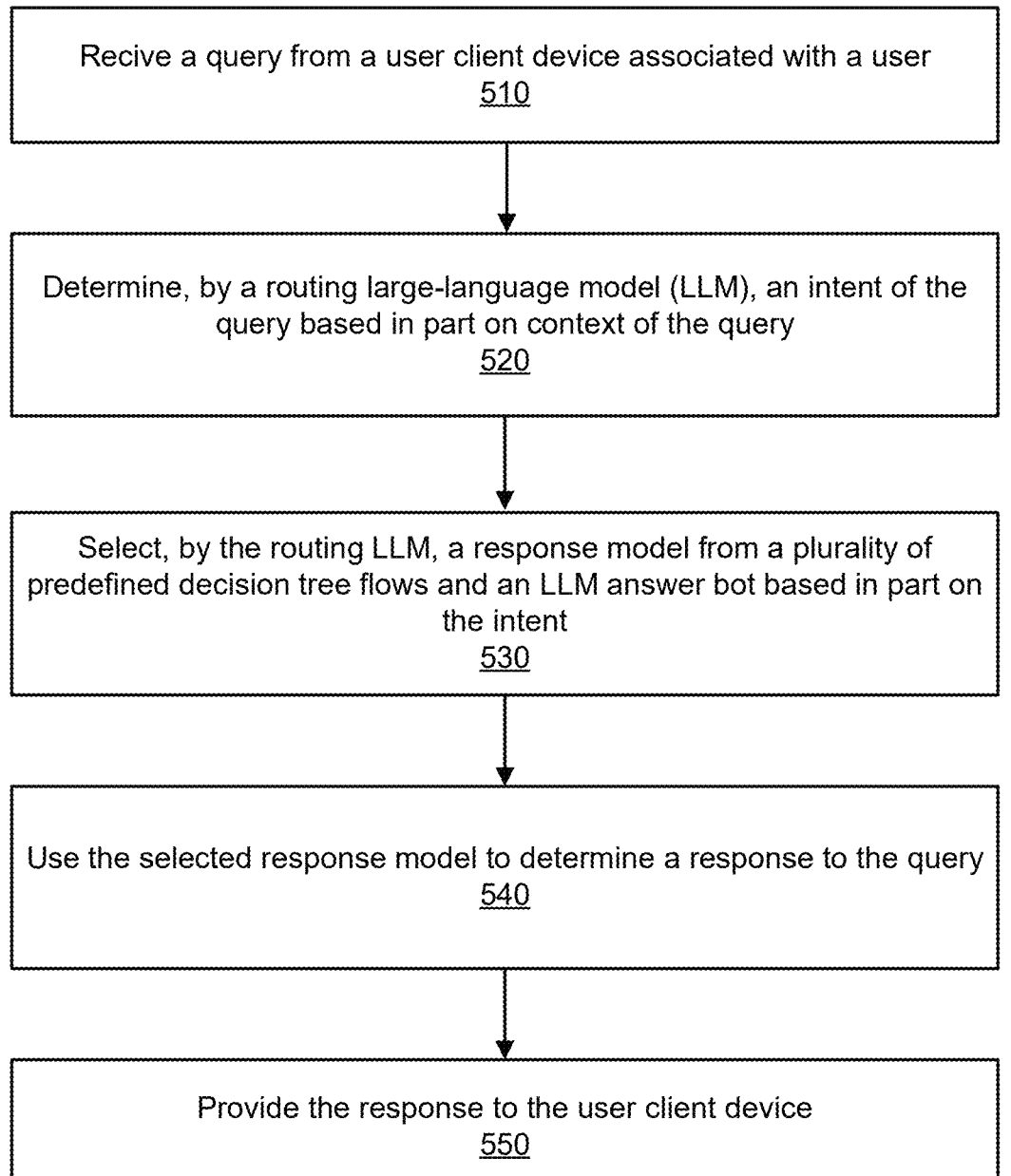
FIG. 5 is a flowchart for a method of balancing use of predefined decision tree flows and an LLM chatbot to respond to queries from user client devices, in accordance with some embodiments.

FIG. 5 is a flowchart for a method of balancing use of predefined decision tree flows and an LLM chatbot to respond to queries from user client devices, in accordance with some embodiments. Alternative embodiments may include more, fewer, or different steps from those illustrated in FIG. 5, and the steps may be performed in a different order from that illustrated in FIG. 5. These steps may be performed by an online system (e.g., online system 140). Additionally, each of these steps may be performed automatically by the online system without human intervention.

The online system receives 510 a query from a user client device. The query may be received as part of a session (e.g., online chat session) between the online system and the user client device.

The online system determines 520 an intent of the user based in part on context of the query. The online system may use a routing LLM (e.g., the routing LLM 310) of a hybrid AI agent (e.g., the hybrid AI agent 150) to determine the intent. The hybrid AI agent may prompt the routing LLM to determine an intent associated with the query. In some embodiments, the hybrid AI agent may request (e.g., via one or more messages in the session) additional information from the user client device in order for the routing LLM to better determine the intent. For example, the online system may retrieve data associated with the user from, e.g., a data store (e.g., the data store 240). The routing LLM may generate a message requesting additional information for the query, the generating based in part on the data and the query. The online system may provide the message to the user client device. Responsive to the message provided to the user client device, the online system may receive a message from the user client device that includes additional information. The routing LLM may determine the intent of the query based in part on the context and additional information gathered from the user client device during the session or gathered from previous sessions (e.g., session data) associated with the user. In some embodiments one or more rounds of messaging occurs before the routing LLM is able to determine an intent of the user.

The online system selects 530 a response model from a plurality of predefined decision tree flows and an LLM chatbot based in part on the intent. The online system may select the response model using, e.g., the routing LLM. In some embodiments, the routing LLM may score each of the predefined decision tree flows based on the determined intent for the query. The routing LLM may rank the scored plurality of predefined decision tree flows. The routing LLM may identify a predefined decision tree flow as having a highest score. If the score of the predefined decision tree flow is above a threshold score, the routing LLM may select the predefined decision tree flow as the response model. And if the score of the predefined decision tree flow is below the threshold score, the routing LLM may select the LLM chatbot as the response model.

The online system uses 540 the selected response model to determine a response to the query. For example, if the intent were to reschedule an order, the selected response model may reschedule the order in accordance with information from the user.

The online system provides 550 the response to the user client device. The online system may provide the response as part of the session.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:
   receiving a query from a user client device that is associated with a user;
   identifying, by a routing large language model (LLM), an intent of the user based in part on context associated with the query;
   scoring each of a plurality of predefined decision tree flows based on the intent;
   selecting, by the routing LLM and based in part on the intent, a response model from the plurality of predefined decision tree flows and a LLM chatbot, wherein selecting the response model from the plurality of predefined decision tree flows and the LLM chatbot comprises:
   identifying a first predefined decision tree flow, of the plurality of predefined decision tree flows, with a highest score,
   determining that the score of the first predefined decision tree flow is below a threshold score,
   generating, by the routing LLM, a message requesting additional information for the query,
   providing the message to the user client device,
   receiving a message from the user client device that includes additional information,
   identifying, by the routing LLM, an updated intent of the query based in part on the context and the additional information from the message,
   scoring each of the plurality of predefined decision tree flows based on the updated intent, identifying a second predefined decision tree flow, of the plurality of predefined decision tree flows, with a highest score, and responsive to determining that the score of the second predefined decision tree flow is above a threshold score, selecting the second predefined decision tree flow as the response model;

using the selected response model to generate a response to the query; and providing the response to the user client device, wherein providing the response to the user client device causes the user client device to display the response.

2. The method of claim 1, wherein identifying, by the routing LLM, the intent of the user based in part on the context of the query comprises:

retrieving data associated with the user;

generating, by the routing LLM, a message requesting additional information for the query, the generating based in part on the data and the query;

providing the message to the user client device;

receiving a message from the user client device that includes additional information; and identifying, by the routing LLM, the intent of the query based on the context and based on the additional information from the user client device.

3. The method of claim 1, further comprising:

scoring each of the plurality of predefined decision tree flows based on the intent, wherein selecting, by the routing LLM, the response model from the plurality of predefined decision tree flows and the LLM chatbot based in part on the intent, further comprises:

identifying a first predefined decision tree flow, of the plurality of predefined decision tree flows, with a highest score, if the score of the first predefined decision tree flow is above a threshold score, selecting the first predefined decision tree flow as the response model, and if the score of the first predefined decision tree flow is below the threshold score, selecting the LLM chatbot as the response model.

4. The method of claim 1, wherein the first predefined decision tree flow is the second predefined decision tree flow.

5. The method of claim 1, wherein using the selected response model to generate the response to the query further comprises:

retrieving order data associated with the user; and generating, by the selected response model, the response based in part on the order data and the intent.

6. The method of claim 1, wherein the routing LLM was trained by:

accessing a set of training examples that includes training service data for a plurality of training queries;

applying the routing LLM to the set of training examples to generate a training output corresponding to a set of selections of training response models for at least some of the training queries;

back-propagating one or more error terms obtained from one or more loss functions to update a set of parameters of the routing LLM, and one or more of the error terms are based on a difference between a label applied to a test interaction of the set of training examples and the set of selections of training response models; and stopping the back-propagation after the one or more loss functions satisfy one or more criteria.

7. The method of claim 1, further comprising:

receiving feedback from the user client device on the response;

generating additional training examples that include service data associated with different queries including the query; and fine tuning the routing LLM using the additional training examples.

8. The method of claim 1, wherein each predefined decision tree flow of the plurality of predefined decision tree flows is designed to perform one or more of: cancelling an order, rescheduling an order, or tracking a package.

9. A computer program product comprising a non-transitory computer readable storage medium having instructions encoded thereon that, when executed by a processor of a computer system, cause the computer system to perform steps comprising:

receiving a query from a user client device that is associated with a user;

identifying, by a routing large language model (LLM), an intent of the user based in part on context associated with the query;

scoring each of a plurality of predefined decision tree flows based on the intent;

selecting, by the routing LLM and based in part on the intent, a response model from the plurality of predefined decision tree flows and a LLM chatbot, wherein selecting the response model from the plurality of predefined decision tree flows and the LLM chatbot comprises:

identifying a first predefined decision tree flow, of the plurality of predefined decision tree flows, with a highest score, determining that the score of the first predefined decision tree flow is below a threshold score, generating, by the routing LLM, a message requesting additional information for the query, providing the message to the user client device, receiving a message from the user client device that includes additional information, identifying, by the routing LLM, an updated intent of the query based in part on the context and the additional information from the message, scoring each of the plurality of predefined decision tree flows based on the updated intent, identifying a second predefined decision tree flow, of the plurality of predefined decision tree flows, with a highest score, and responsive to determining that the score of the second predefined decision tree flow is above a threshold score, selecting the second predefined decision tree flow as the response model;

using the selected response model to generate a response to the query; and providing the response to the user client device, wherein providing the response to the user client device causes the user client device to display the response.

10. The computer program product of claim 9, wherein the encoded instructions for identifying, by the routing LLM, the intent of the user based in part on the context of the query cause the computer system to perform steps comprising:

retrieving data associated with the user;

generating, by the routing LLM, a message requesting additional information for the query, the generating based in part on the data and the query;

providing the message to the user client device;

receiving a message from the user client device that includes additional information; and identifying, by the routing LLM, the intent of the query based on the context and based on the additional information from the user client device.

11. The computer program product of claim 9, further comprising encoded instructions that when executed cause the computer system to perform steps comprising:

scoring each of the plurality of predefined decision tree flows based on the intent, wherein the encoded instructions for selecting, by the routing LLM, the response model from the plurality of predefined decision tree flows and the LLM chatbot based in part on the intent cause the computer system to perform steps comprising:

identifying a first predefined decision tree flow, of the plurality of predefined decision tree flows, with a highest score, if the score of the first predefined decision tree flow is above a threshold score, selecting the first predefined decision tree flow as the response model, and if the score of the first predefined decision tree flow is below the threshold score, selecting the LLM chatbot as the response model.

12. The computer program product of claim 9, wherein the first predefined decision tree flow is the second predefined decision tree flow.

13. The computer program product of claim 9, wherein the encoded instructions for using the selected response model to generate a response to the query cause the computer system to perform steps comprising:

retrieving order data associated with the user; and generating, by the selected response model, the response based in part on the order data and the intent.

14. The computer program product of claim 9, wherein the routing LLM was trained by:

accessing a set of training examples that includes training service data for a plurality of training queries;

applying the routing LLM to the set of training examples to generate a training output corresponding to a set of selections of training response models for at least some of the training queries;

back-propagating one or more error terms obtained from one or more loss functions to update a set of parameters of the routing LLM, and one or more of the error terms are based on a difference between a label applied to a test interaction of the set of training examples and the set of selections of training response models; and stopping the back-propagation after the one or more loss functions satisfy one or more criteria.

15. The computer program product of claim 9, further comprising encoded instructions that when executed cause the computer system to perform steps comprising:

receiving feedback from the user client device on the response;

generating additional training examples that include service data associated with different queries including the query; and fine tuning the routing LLM using the additional training examples.

16. The computer program product of claim 9, wherein each predefined decision tree flow of the plurality of predefined decision tree flows is designed to perform one or more of: cancelling an order, rescheduling an order, or tracking a package.

17. A computer system comprising:

a processor; and a non-transitory computer readable storage medium having instructions encoded thereon that, when executed by the processor, cause the computer system to perform steps comprising:

receiving a query from a user client device that is associated with a user, identifying, by a routing large language model (LLM), an intent of the user based in part on context associated with the query, scoring each of a plurality of predefined decision tree flows based on the intent, selecting, by the routing LLM and based in part on the intent, a response model from the plurality of predefined decision tree flows and a LLM chatbot, wherein selecting the response model from the plurality of predefined decision tree flows and the LLM chatbot comprises:

identifying a first predefined decision tree flow, of the plurality of predefined decision tree flows, with a highest score, determining that the score of the first predefined decision tree flow is below a threshold score, generating, by the routing LLM, a message requesting additional information for the query, providing the message to the user client device, receiving a message from the user client device that includes additional information, identifying, by the routing LLM, an updated intent of the query based in part on the context and the additional information from the message, scoring each of the plurality of predefined decision tree flows based on the updated intent, identifying a second predefined decision tree flow, of the plurality of predefined decision tree flows, with a highest score, and responsive to determining that the score of the second predefined decision tree flow is above a threshold score, selecting the second predefined decision tree flow as the response model;

using the selected response model to generate a response to the query, and providing the response to the user client device, wherein providing the response to the user client device causes the user client device to display the response.

18. The computer system of claim 17, wherein the encoded instructions for identifying, by the routing LLM, the intent of the user based in part on the context of the query cause the computer system to perform steps comprising:

retrieving data associated with the user;

generating, by the routing LLM, a message requesting additional information for the query, the generating based in part on the data and the query;

providing the message to the user client device;

receiving a message from the user client device that includes additional information; and identifying, by the routing LLM, the intent of the query based on the context and based on the additional information from the user client device.

19. The computer system of claim 17, further comprising encoded instructions that when executed cause the computer system to perform steps comprising:

scoring each of the plurality of predefined decision tree flows based on the intent, wherein the encoded instructions for selecting, by the routing LLM, the response model from the plurality of predefined decision tree flows and the LLM chatbot based in part on the intent cause the computer system to perform steps comprising:

identifying a first predefined decision tree flow, of the plurality of predefined decision tree flows, with a highest score, if the score of the first predefined decision tree flow is above a threshold score, selecting the first predefined decision tree flow as the response model, and if the score of the first predefined decision tree flow is below the threshold score, selecting the LLM chatbot as the response model.

20. Computer system of claim 17, wherein each predefined decision tree flow of the plurality of predefined decision tree flows is designed to perform one or more of: cancelling an order, rescheduling an order, or tracking a package.

\* \* \* \* \*